(12) United States Patent
Uno et al.

(10) Patent No.: US 11,283,359 B2
(45) Date of Patent: Mar. 22, 2022

(54) SYNCHRONOUS RECTIFICATION DC-DC CONVERTER AND SWITCHING POWER SUPPLY DEVICE

(71) Applicant: Murata Manufacturing Co., Ltd., Nagaokakyo (JP)

(72) Inventors: Yoshiyuki Uno, Nagaokakyo (JP); Yoshiaki Mizushima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 106 days.

(21) Appl. No.: 16/708,546

(22) Filed: Dec. 10, 2019

(65) Prior Publication Data

US 2020/0119649 A1 Apr. 16, 2020

Related U.S. Application Data

(63) Continuation of application No. PCT/JP2018/019437, filed on May 21, 2018.

(30) Foreign Application Priority Data

Jun. 22, 2017 (JP) .............................. JP2017-122410

(51) Int. Cl.
*H02M 3/158* (2006.01)
*B60R 16/03* (2006.01)
(Continued)

(52) U.S. Cl.
CPC ........... *H02M 3/1588* (2013.01); *B60R 16/03* (2013.01); *H02J 7/0024* (2013.01);
(Continued)

(58) Field of Classification Search
CPC ............. H02M 3/33592; H02M 3/157; H02M 3/1588; H02J 7/0024; Y02T 10/92; B60R 16/03
(Continued)

(56) References Cited

U.S. PATENT DOCUMENTS

2008/0111531 A1* 5/2008 Hasegawa ........... H02M 3/1588
                                                  323/284
2016/0254749 A1* 9/2016 Kawakami ............. H02M 1/08
                                                  323/271

FOREIGN PATENT DOCUMENTS

| JP | 08-251915 A | 9/1996 |
| JP | 2006-060977 A | 3/2006 |
| JP | 2013-100040 A | 5/2013 |

OTHER PUBLICATIONS

Official Communication issued in International Patent Application No. PCT/JP2018/019437, dated Jul. 10, 2018.

* cited by examiner

*Primary Examiner* — Arnold M Kinkead (74) *Attorney, Agent, or Firm* — Keating & Bennett, LLP (57) ABSTRACT

A DC-DC converter includes a synchronous rectification converter that converts electric power, a voltage detection circuit that detects a voltage proportional to an output voltage of the converter, a converter controller that compares a detection voltage detected by the voltage detection circuit with a reference voltage and controls an operation of the converter to provide a constant or substantially constant voltage of the detection voltage, and a command processor that sets, in a case where a target voltage command value input from an ECU is lower than a voltage value of the output voltage of the converter, a voltage value of the reference voltage to be equal or substantially equal to a voltage value of the detection voltage.

14 Claims, 7 Drawing Sheets

(51) Int. Cl.
*H02J 7/00* (2006.01)
*H02M 3/335* (2006.01)
*H02M 3/157* (2006.01)

(52) U.S. Cl.
CPC ........ *H02M 3/33592* (2013.01); *H02M 3/157* (2013.01); *Y02T 10/92* (2013.01)

(58) Field of Classification Search
USPC .............................. 323/271, 284; 307/9.1, 18
See application file for complete search history.

SYNCHRONOUS RECTIFICATION DC-DC CONVERTER AND SWITCHING POWER SUPPLY DEVICE

CROSS REFERENCE TO RELATED APPLICATIONS

This application claims the benefit of priority to Japanese Patent Application No. 2017-122410 filed on Jun. 22, 2017 and is a Continuation Application of PCT Application No. PCT/JP2018/019437 filed on May 21, 2018. The entire contents of each application are hereby incorporated herein by reference.

BACKGROUND OF THE INVENTION

1. Field of the Invention

The present invention relates to a synchronous rectification DC-DC converter and a switching power supply device.

2. Description of the Related Art

A synchronous rectification DC-DC converter that includes two switching elements connected in series between output ends of a DC power supply, a terminal connected to a connecting point between the two switching elements with an inductor interposed therebetween, and a control IC controlling turning on and turning off of the two switching elements, is suggested (see, for example, Japanese Unexamined Patent Application Publication No. 2006-60977). In the synchronous rectification DC-DC converter, a current flowing in a switching element connected to an output end on a low potential side of the DC power supply is monitored, and when backflow of a current from the terminal side to the DC power supply side is detected, the switching element connected to the output end on the low potential side of the DC voltage source is turned off. Thus, the current flowing from the terminal side to the DC voltage source side (backflow) is reduced.

However, in the case of the synchronous rectification DC-DC converter described in Japanese Unexamined Patent Application Publication No. 2006-60977, a current monitor circuit that has quick response characteristics in which a current flowing in a switching element that is repeatedly turned on and turned off at high speed can be monitored based on the voltage across the switching element in an ON state, needs to be provided separately. Thus, due to the current monitor circuit separately provided, the DC-DC converter may have a complicated circuit configuration. Furthermore, if the response characteristics of the current monitor circuit are insufficient, accuracy in detection of backflow may be degraded, and backflow cannot be sufficiently reduced. If backflow occurs in the case where a power storage device is used as a DC voltage source, overcharge may occur.

SUMMARY OF THE INVENTION

Preferred embodiments of the present invention provide synchronous rectification DC-DC converters each with a simplified circuit configuration and backflow being reliably reduced.

A synchronous rectification DC-DC converter according to a preferred embodiment of the present invention includes a synchronous rectification converter that converts electric power; a voltage detection circuit that detects a voltage proportional to an output voltage of the converter; a converter controller that compares a detection voltage detected by the voltage detection circuit with a reference voltage and controls an operation of the converter to provide a constant or substantially constant voltage of the detection voltage; and a command processor that sets, in a case where a target voltage command value input from outside is lower than a voltage value of the output voltage, a voltage value of the reference voltage to be equal or substantially equal to a voltage value of the detection voltage.

Furthermore, in a synchronous rectification DC-DC converter according to a preferred embodiment of the present invention, in a case where a state in which the target voltage command value input from the outside is lower than the voltage value of the output voltage continues for a preset reference time or longer, the command processor may output to the converter controller a stop signal that signals the converter controller to stop the operation of the converter.

A synchronous rectification DC-DC converter according to a preferred embodiment of the present invention includes a synchronous rectification converter that converts electric power; a voltage detection circuit that detects a voltage proportional to an output voltage of the converter; a converter controller that compares a detection voltage detected by the voltage detection circuit with a reference voltage and controls an operation of the converter to provide a constant or substantially constant voltage of the detection voltage; and a command processor that outputs, in a case where a target voltage command value input from outside is lower than a voltage value of the output voltage, to the converter controller a stop signal that signals the converter controller to stop the operation of the converter.

A switching power supply device according to a preferred embodiment of the present invention charges a first power storage device, and includes a second power storage device; and a synchronous rectification DC-DC converter as described above. The second power storage device is electrically connected to an input side of the DC-DC converter. The converter converts electric power supplied from the second power storage device and supplies the converted electric power to the first power storage device.

According to the preferred embodiments of the present invention, the converter controller compares the voltage detected by the voltage detection circuit with the reference voltage, and controls an operation of the converter such the detection voltage becomes constant or substantially constant. Furthermore, in the case where the target voltage command value input from the outside is lower than the output voltage value of the converter, the command processor sets the reference voltage to be equal or substantially equal to the voltage value corresponding to the output voltage of the converter. Accordingly, for example, there is no need to provide a current monitor circuit that monitors a current flowing in an inductor. Therefore, backflow is reliably reduced, and the circuit configuration is simplified.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Hereinafter, preferred embodiments of the present invention will be described in detail with reference to drawings. A synchronous rectification DC-DC converter according to a first preferred embodiment of the present invention is, for example, electrically connected between a first power storage device and a second power storage device, converts electric power supplied from the second power storage device, and supplies the converted electric power to the first power storage device. The synchronous rectification DC-DC converter includes a converter controller that performs control to provide an output voltage that is constant or substantially constant at a voltage equal or substantially equal to a reference voltage and a command processor that sets the reference voltage in accordance with a target voltage command value input from the outside. In the case where the target voltage command value is lower than the output voltage value, the synchronous rectification DC-DC converter sets the reference voltage to be equal or substantially equal to a detection voltage detected by a voltage detection circuit. Thus, backflow from the first power storage device to the second power storage device can be reduced.

Figure 1:
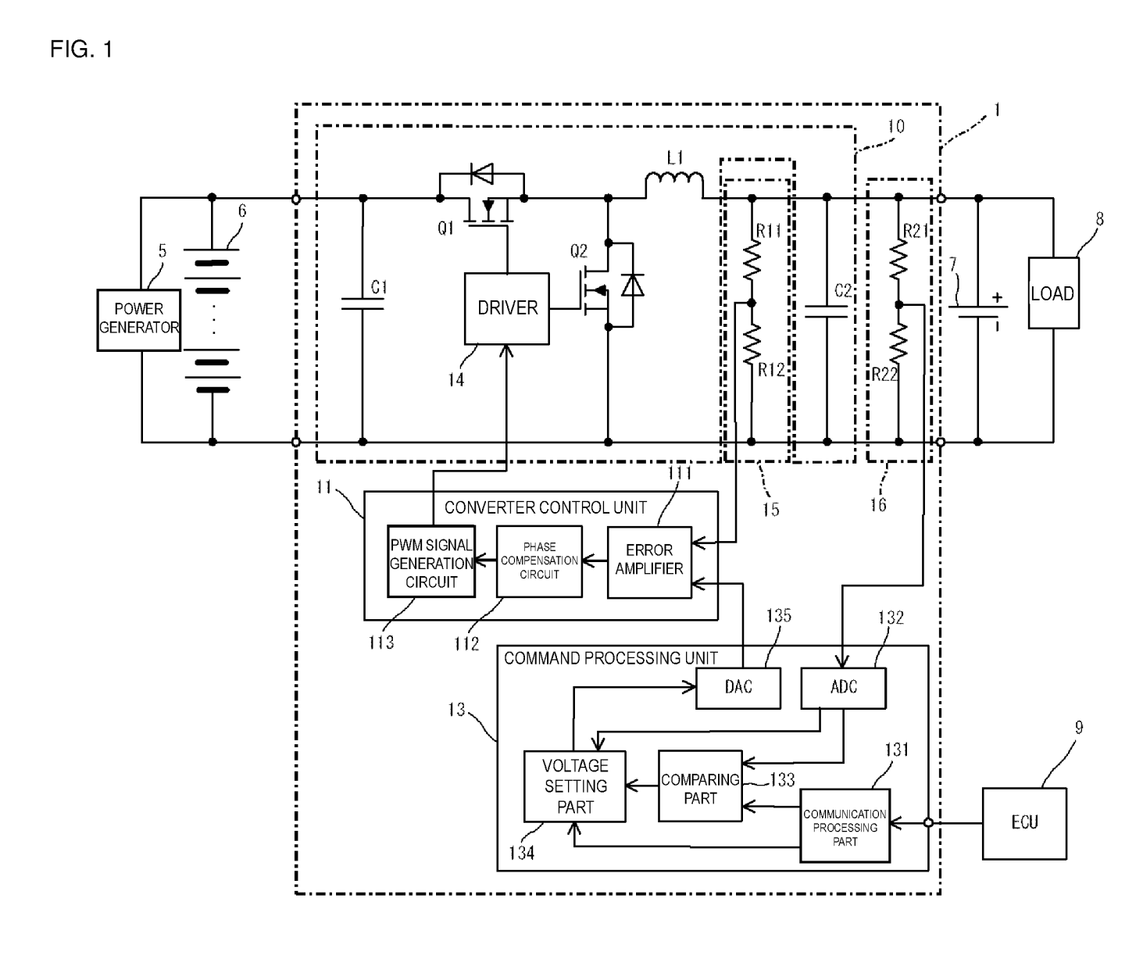
FIG. 1 is a circuit diagram of a switching power supply device according to a first preferred embodiment of the present invention.

The synchronous rectification DC-DC converter according to the first preferred embodiment (hereinafter, simply referred to as a "DC-DC converter") is preferably, for example, electrically connected between a main battery, which is the second power storage device, and a sub-battery, which is the first power storage device, mounted on a vehicle. For example, as shown in FIG. 1, a power generator 5 and a main battery 6 are electrically connected to an input side of a DC-DC converter 1 according to the first preferred embodiment, and a sub-battery 7 and a load 8, which is on-vehicle equipment, are electrically connected to an output side of the DC-DC converter 1. The DC-DC converter 1, together with the main battery 6, defines a switching power supply device that supplies electric power to the sub-battery 7 and the load 8. The power generator 5 includes, for example, a rotator and a rectifying and smoothing circuit. At the time when the vehicle is travelling normally, the power generator 5 generates electric power in a constant voltage mode that outputs a constant or substantially constant voltage. At the time when the brake of the vehicle is applied, the power generator 5 generates electric power in a constant power mode that outputs a constant or substantially constant power.

The main battery 6 and the sub-battery 7 are defined by, for example, an assembled battery including a plurality of battery cells electrically connected in series. A battery cell of the main battery 6 is, for example, a lead storage battery. A battery cell of the sub-battery 7 is, for example, a lithium-ion battery, a molten salt battery, or the like. The output voltage of the main battery 6 and the sub-battery 7 is preferably, for example, from about 8 V to about 14 V. The output voltage of the main battery 6 and the sub-battery 7 varies according to the amount charged in the main battery 6 and the sub-battery 7. Note that the sub-battery 7 may be, for example, an electric double layer capacitor.

The DC-DC converter 1 includes a converter 10, a converter controller 11 that controls an operation of the converter 10, and two voltage detection circuits 15 and 16 that detect an output voltage of the converter 10. The DC-DC converter 1 also includes a command processor 13 that commands the converter controller 11 to operate. An ECU (Engine Controller) 9 is electrically connected to the command processor 13 through a CAN (Control Area Network).

The converter 10 converts electric power supplied from the power generator 5 or the main battery 6 and supplies the converted electric power to the sub-battery 7 and the load 8. The converter 10 includes an inductor L1, a switching element Q1, a switching element Q2, and a driver 14 that drives the switching elements Q1 and Q2. The switching elements Q1 and Q2 are preferably, for example, N-channel FETs (Field Effect Transistors). The drain of the switching element Q1 is electrically connected to an output end on a high potential side of the main battery 6, and the source of the switching element Q1 is electrically connected to one end of the inductor L1. The drain of the switching element Q2 is electrically connected to the one end of the inductor L1, and the source of the switching element Q2 is electrically connected to an output end on a low potential side of the main battery 6. The other end of the inductor L1 is electrically connected to an output end on a high potential side of the sub-battery 7. Furthermore, the converter 10 includes a capacitor C1 whose one end is electrically connected to the output end on the high potential side of the main battery 6 and whose other end is electrically connected to the output end on the low potential side of the main battery and a capacitor C2 whose one end is electrically connected to the other end of the inductor L1, that is, the output end on the high potential side of the sub-battery 7, and whose other end is electrically connected to an output end on a low potential side of the sub-battery 7. The driver 14 applies voltage to the gates of the switching elements Q1 and Q2, based on a PWM (Pulse Width Modulation) signal input from the converter controller 11.

The voltage detection circuits 15 and 16 detect a voltage proportional to the output voltage of the converter 10. The voltage detection circuit 15 is a voltage divider circuit including two resistors R11 and R12 that are electrically connected in series and is electrically connected in parallel with the capacitor C1. The voltage detection circuit 15 outputs voltage obtained by dividing, with the resistors R11 and R12, the voltage across the capacitor C1. The voltage detection circuit 16 is also a voltage divider circuit including two resistors R21 and R22 that are electrically connected in series and is electrically connected in parallel with the capacitor C1. The voltage detection circuit 16 outputs voltage obtained by dividing, with the resistors R21 and R22, the voltage across the capacitor C1. Furthermore, voltage division ratios Fp of the voltage detection circuits 15 and 16 are set to be the same or substantially the same.

The converter controller 11 compares the detection voltage detected by the voltage detection circuit 15 with a reference voltage, and controls an operation of the converter 10 to provide a constant or substantially constant voltage of the detection voltage. The converter controller 11 is an analog circuit including an error amplifier 111, a phase compensation circuit 112, and a PWM signal generation circuit 113. The error amplifier 111 amplifies a differential voltage between the voltage input from the voltage detection circuit 15 and the reference voltage input from the command processor 13, and outputs the amplified differential voltage. The phase compensation circuit 112 is, for example, a series circuit including a capacitor and a resistor and is provided to stabilize a feedback loop for the output voltage of the converter 10. The PWM signal generation circuit 113 includes, for example, a triangular wave generator and a comparator. The PWM signal generation circuit 113 generates a PWM signal having a duty ratio corresponding to the differential voltage between the voltage input from the voltage detection circuit 15 and the reference voltage, and outputs the generated PWM signal to the driver 14.

The driver 14 applies voltage to the gates of the switching elements Q1 and Q2, based on a PWM signal input from the converter controller 11, so that the switching elements Q1 and Q2 perform ON and OFF operations. The driver 14 alternately turns on and turns off the switching elements Q1 and Q2.

The command processor 13 includes a communication processing portion 131 that is electrically connected to the ECU 9 through the CAN, a comparing portion 133, and a voltage setting portion 134. The command processor 13 further includes an analog-digital converter (hereinafter, referred to as an "ADC") 132, and a digital-analog converter (hereinafter, referred to as a "DAC") 135. The command processor 13 includes a computer including, for example, a processor and a memory. When the processor executes a program stored in the memory, the communication processing portion 131, the comparing portion 133, and the voltage setting portion 134 are implemented. The communication processing portion 131 performs protocol conversion of information indicating a target voltage command value received from the ECU 9 through the CAN, and notifies the comparing portion 133 of the resultant information. The ADC 132 converts the voltage input from the voltage detection circuit 15 into a digital voltage value, and notifies the comparing portion 133 of the digital voltage value.

The comparing portion 133 calculates an output voltage value of the converter 10, based on a voltage value input from the ADC 132. Then, the comparing portion 133 compares the target voltage command value with the calculated output voltage value of the converter 10, and notifies the voltage setting portion 134 of information indicating the comparison result.

In the case where, according to the information indicating the comparison result notified from the comparing portion 133, the target voltage command value is equal to or higher than the output voltage value of the converter 10, the voltage setting portion 134 notifies the DAC 135 of a voltage value that is obtained by multiplying the target voltage command value by the voltage division ratio Fp of the voltage detection circuit 15. In contrast, in the case where the target voltage command value is lower than the output voltage value of the DC power supply 10, the voltage setting portion 134 notifies the DAC 135 of a voltage value of the detection voltage detected by the voltage detection circuit 16. The DAC 135 outputs to the error amplifier 111 of the converter controller 11 the voltage corresponding to the voltage value notified from the voltage setting portion 134.

A basic operation of the DC-DC converter 1 according to the first preferred embodiment will be described below. The DC-DC converter 1 converts electric power supplied from the power generator 5 and the main battery 6, and supplies the converted electric power to the sub-battery 7 and the load 8. At this time, the converter controller 11 controls the ON duty of the switching element Q1 in the converter 10, and the voltage on the output side of the DC-DC converter 1 becomes equal or substantially equal to the reference voltage input from the command processor 13. That is, in the case where the voltage on the output side is higher than the reference voltage, the ON duty is reduced, so that the amount of electric power transmitted from the input side to the output side can be reduced. Furthermore, in the case where the voltage on the output side is lower than the reference voltage, the ON duty is increased, so that the amount of electric power transmitted from the input side to the output side can be increased.

Accordingly, even in the case where the voltage on the input side of the DC-DC converter 1 increases or the reference voltage changes at the time when the brake of the vehicle is applied, a voltage equal or substantially equal to the reference voltage can be applied to the sub-battery 7 and the load 8 by appropriately controlling the ON duty of the switching element Q1.

Figure 2:
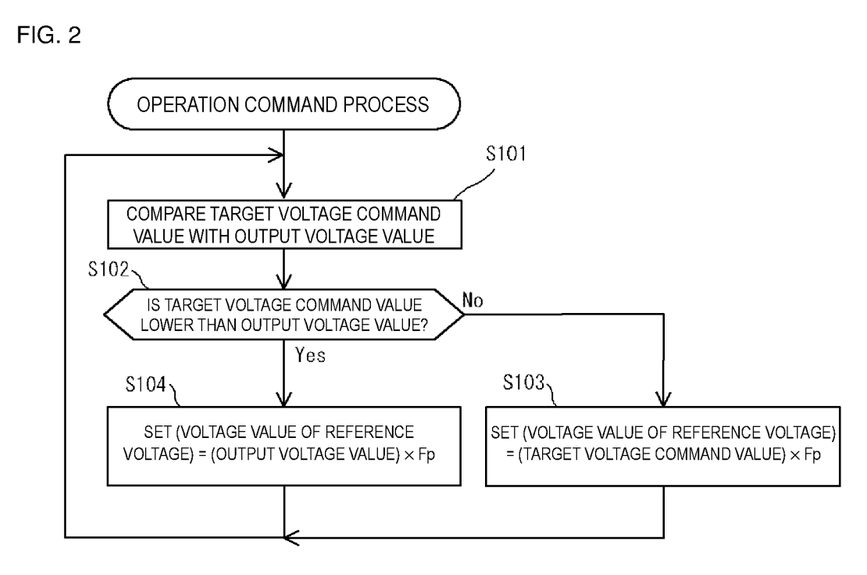
FIG. 2 is a flowchart showing an example of the flow of an operation command process performed by a command processor according to the first preferred embodiment of the present invention.

Next, an operation command process performed by the command processor 13 according to the first preferred embodiment will be described with reference to FIG. 2. For example, when power is applied to the DC-DC converter 1, the operation command process starts. First, the comparing portion 133 calculates an output voltage value of the converter 10, based on a voltage value input from the ADC 132, and compares a target voltage command value with the calculated output voltage value of the converter 10 (step S101). The comparing portion 133 notifies the voltage setting portion 134 of information indicating a comparison result.

Next, the voltage setting portion 134 determines, based on the information indicating the comparison result, which is notified from the comparing portion 133, whether or not the target voltage command value is lower than the output voltage value of the converter 10 (step S102). It is assumed that the voltage setting portion 134 determines that the target voltage command value is equal or substantially equal to or higher than the output voltage value of the converter 10 (step S102: No). In this case, the voltage setting portion 134 notifies the DAC 135 of a voltage value obtained by multiplying the target voltage command value by a voltage division ratio of the voltage detection circuit 15. Thus, the voltage setting portion 134 sets the voltage value of a reference voltage output from the DAC 135 to the voltage value obtained by multiplying the target voltage command value by a preset voltage division ratio Fp (step S103). Subsequently, the processing of step S101 is performed again.

In contrast, it is assumed that the target voltage command value is lower than the output voltage value of the converter 10 (step S102: Yes). For example, in the case where a target voltage command value that is lower than the output voltage of the DC-DC converter 1 is received from the ECU 9, the voltage setting portion 134 notifies the DAC 135 of the voltage value of the detection voltage detected by the voltage detection circuit 16. Thus, the voltage setting portion 134 sets the voltage value of the reference voltage output from the DAC 135 to the voltage value of the detection voltage detected by the voltage detection circuit 16, that is, the voltage value obtained by multiplying the output voltage of the converter 10 by a preset voltage division ratio Fp (step S104). As a result, the ON duty of the switching element Q1 is set to a value that does not cause backflow in the converter 10. However, the voltage value of the output voltage of the DC-DC converter 1 is maintained at a voltage value higher than the target voltage command value. Subsequently, the processing of step S101 is performed again.

Figure 3A:
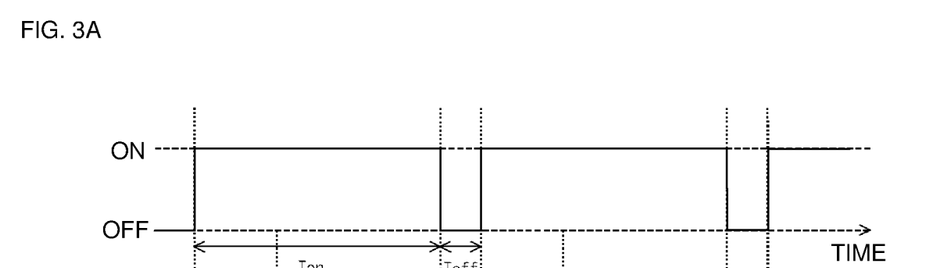
FIGS. 3A to 3D are time charts showing an example of the relationship of an operation of a switching element Q1 and a current flowing in an inductor L1 in a converter in the first preferred embodiment of the present invention.
Figure 3B:
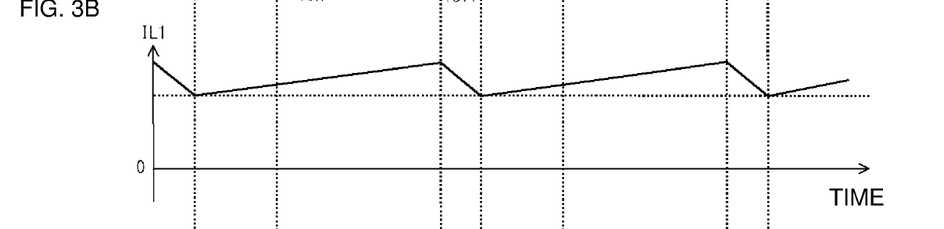

Next, an operation of the DC-DC converter 1 according to the first preferred embodiment will be explained by comparing it with an operation of a DC-DC converter according to a comparative example. The DC-DC converter according to the comparative example has a configuration the same or substantially the same as the DC-DC converter 1 but is different from the DC-DC converter 1 in that the voltage value of the reference voltage input to the converter controller 11 is always a voltage value obtained by multiplying the target voltage command value input from the ECU 9 by a preset voltage division ratio Fp. First, the relationship of the ON duty of the switching element Q1 in the DC-DC converter according to the comparative example and the current flowing in the inductor L1 will be explained. In the case where the target voltage command value is equal to or higher than the output voltage of the converter 10, the switching element Q1 performs ON and OFF operations as shown in FIG. 3A, for example. In FIG. 3A, Ton represents a period during which the switching element Q1 is ON, and Toff represents a period during which the switching element Q1 is OFF. Furthermore, when the switching element Q1 is in the OFF state, the driver 14 causes the switching element Q2 to be in the ON state. In the case where the switching element Q1 performs ON and OFF operations as shown in FIG. 3A, the current flowing in the inductor L1 flows from the main battery 6 side to the sub-battery 7 side, as shown in FIG. 3B. Note that, in FIG. 3B, the current flowing in the inductor L1 from the main battery 6 side to the sub-battery 7 side is referred to as being positive, and the current flowing in the opposite direction is referred to as being negative.

Figure 3C:
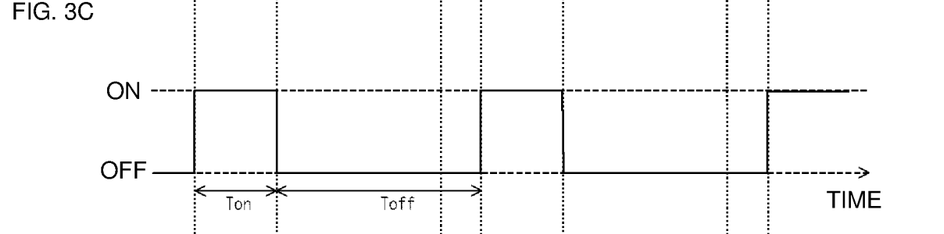
Figure 3D:
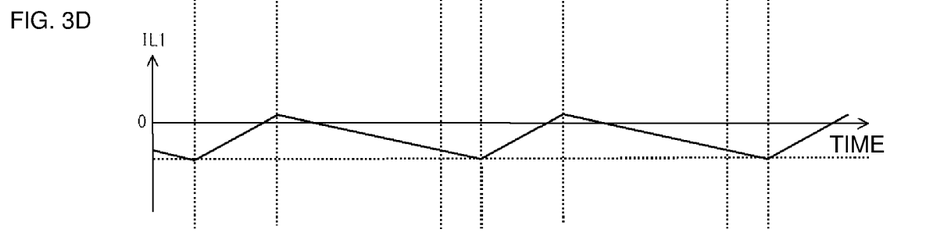

In contrast, in the case where the target voltage command value is lower than the output voltage of the converter 10, the switching element Q1 performs ON and OFF operations as shown in FIG. 3C, for example. That is, the ON duty of the switching element Q1 decreases. In accordance with this, the ON duty of the switching element Q2 increases. Thus, as shown in FIG. 3D, there arises a current flowing in the inductor L1 from the sub-battery 7 side to the main battery 6 side. That is, backflow flowing in the converter 10 from the sub-battery 7 side to the main battery 6 side occurs.

In contrast, in the DC-DC converter 1 according to the first preferred embodiment, in the case where the target voltage command value is lower than the output voltage of the converter 10, the reference voltage input to the converter controller 11 is forcibly set to the voltage value of the detection voltage detected by the voltage detection circuit 16. Accordingly, the ON duty of the switching element Q1 is maintained without being reduced. Thus, the ON duty of the switching element Q1 is set to a value that does not cause backflow in the converter 10.

As described above, in the DC-DC converter 1 according to the first preferred embodiment, the converter controller 11 compares the voltage output from the voltage detection circuit 15 with the reference voltage, and controls an operation of the converter 10 to provide a constant or substantially constant voltage of the output voltage of the converter 10. Furthermore, in the case where the target voltage command value input from the ECU 9 is lower than the output voltage value of the converter 10, the command processor 13 sets the reference voltage to be equal or substantially equal to the detection voltage detected by the voltage detection circuit 16. Accordingly, for example, a current monitor circuit that monitors a current flowing in the inductor L1 is not necessary. Therefore, the circuit configuration of the DC-DC converter 1 can be simplified, while backflow is reliably reduced. Furthermore, backflow in the converter 10 from the sub-battery 7 to the main battery 6 can be reduced. Therefore, an excessive increase in the voltage on the main battery 6 side or overcharging in the main battery 6 can be reduced.

After the DC-DC converter 1 is stopped, a certain amount of time is required to restart the operation of the DC-DC converter 1. Thus, in the DC-DC converter 1 according to the first preferred embodiment, in the case where the target voltage command value input from the ECU 9 is lower than the output voltage value of the converter 10, the command processor 13 sets the reference voltage to be equal or substantially equal to the detection voltage detected by the voltage detection circuit 16. That is, the ON duty of the switching element Q1 is maintained at a value that does not cause backflow in the DC-DC converter 1, without the DC-DC converter 1 being stopped. Accordingly, for example, in the case where switching is performed from a state in which the target voltage command value is lower than the output voltage value of the converter 10 to a state in which the target voltage command value is higher than the output voltage value of the converter 10, the operation of the converter 10 can be quickly changed to an operation suitable for the state. Thus, response characteristics based on stoppage of the DC-DC converter 1 immediately after switching is performed from the state in which the target voltage command value is lower than the output voltage value of the converter 10 to the state in which the target voltage command value is higher than the output voltage value of the converter 10, is able to be significantly improved.

Second Preferred Embodiment

A synchronous rectification DC-DC converter according to a second preferred embodiment of the present invention stops an operation of a converter in the case where a target voltage command value is lower than an output voltage value, and thus reduces backflow to one power storage device from the other power storage device.

Figure 4:
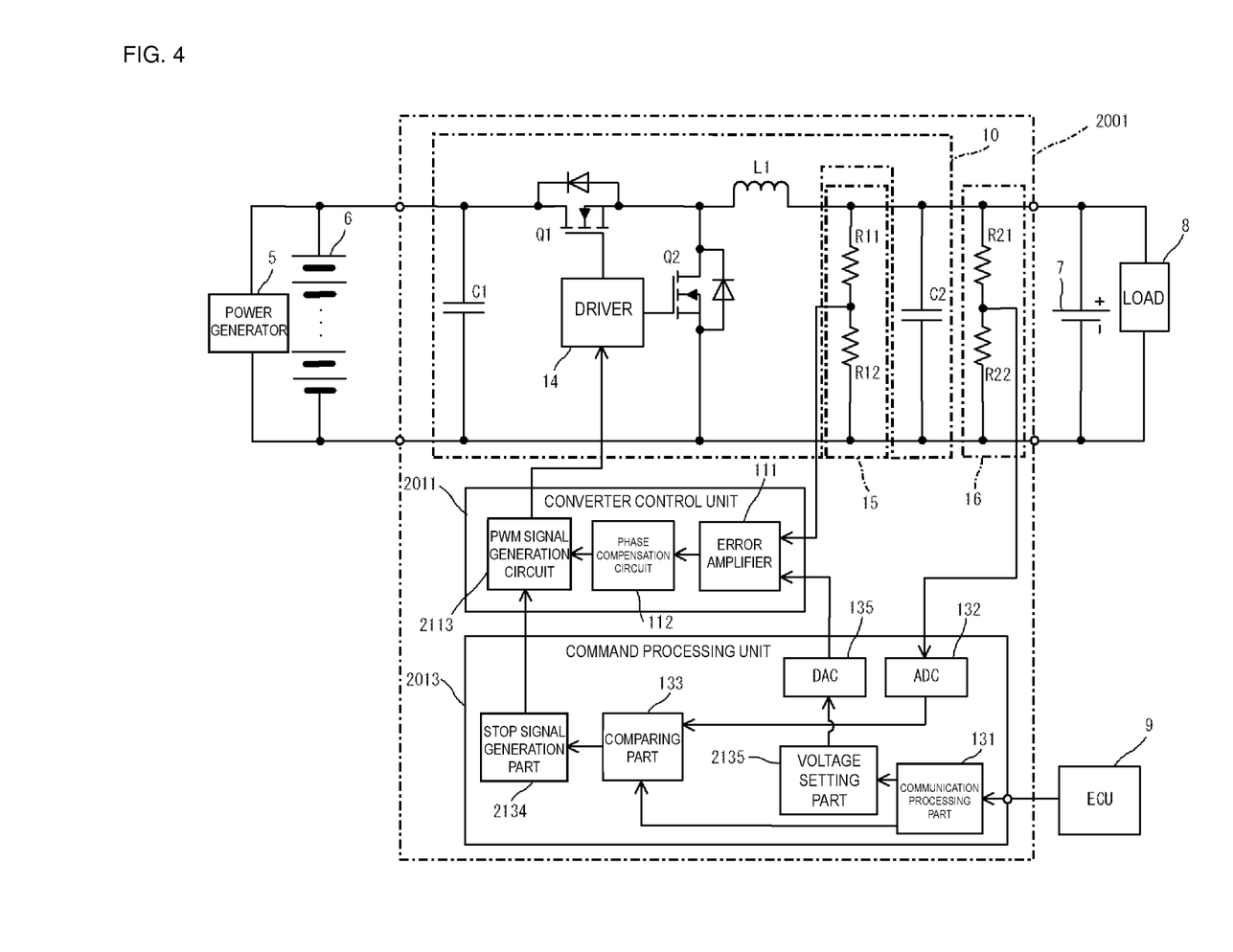
FIG. 4 is a circuit diagram of a switching power supply device according to a second preferred embodiment of the present invention.

For example, as shown in FIG. 4, configurations of a converter controller 2011 and a command processor 2013 of a DC-DC converter 2001 according to the second preferred embodiment is different from the configurations of the converter controller 11 and the command processor 13 in the first preferred embodiment. Note that, in FIG. 4, configurations the same as or similar to those in the first preferred embodiment are referred to with the same reference signs. The converter controller 2011 includes an error amplifier 111, a phase compensation circuit 112, and a PWM signal generation circuit 2113. When a stop signal is input from the command processor 2013, the PWM signal generation circuit 2113 stops outputting a PWM signal to the driver 14.

The command processor 2013 includes a communication processing portion 131, a comparing portion 133, a stop signal generation portion 2134, a voltage setting portion 2135, an ADC 132, and a DAC 135. According to information indicating a comparison result notified from the comparing portion 133, in the case where the target voltage command value is equal to or higher than the output voltage value of the converter 10, the stop signal generation portion 2134 prevents a stop signal from being output to the PWM signal generation circuit 2113 of the converter controller 2011. In contrast, in the case where the target voltage command value is lower than the output voltage value of the converter 10, the stop signal generation portion 2134 generates a stop signal and outputs the generated stop signal to the PWM signal generation circuit 2113 of the converter controller 2011. The voltage setting portion 2135 notifies the DAC 135 of a voltage value obtained by multiplying the target voltage command value by a voltage division ratio Fp of the voltage detection circuit 15.

Figure 5:
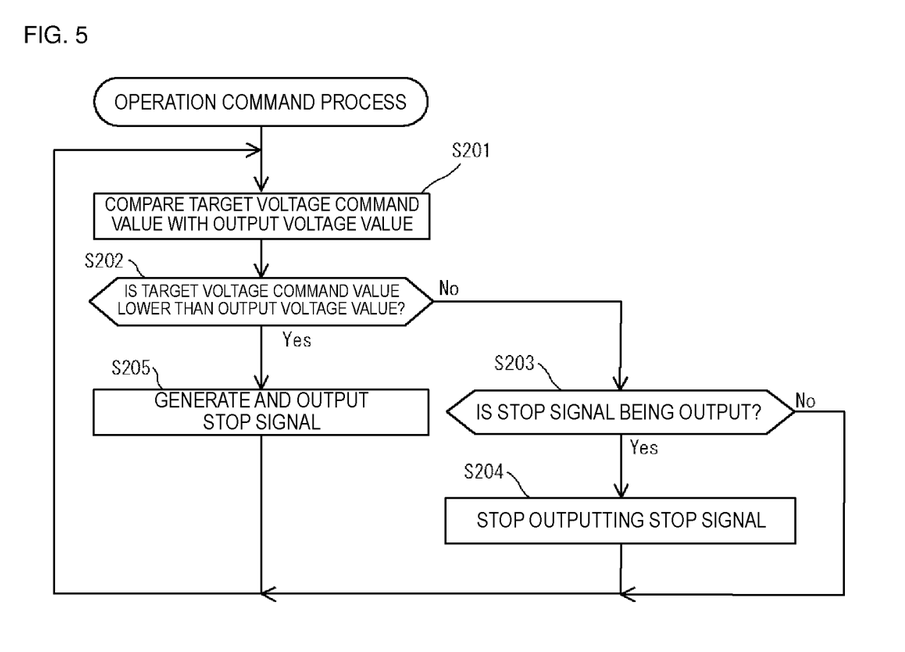
FIG. 5 is a flowchart showing an example of the flow of an operation command process performed by a command processor according to the second preferred embodiment of the present invention.

Next, an operation command process performed by the command processor 2013 according to the second preferred embodiment will be described with reference to FIG. 5. For example, when power is applied to the DC-DC converter 2001, the operation command process starts. First, the comparing portion 133 calculates the output voltage value of the converter 10, based on the voltage value input from the ADC 132, and compares a target voltage command value with the calculated output voltage value of the converter 10 (step S201). The comparing portion 133 notifies the stop signal generation portion 2134 of information indicating a comparison result.

Next, the stop signal generation portion 2134 determines, based on the information indicating the comparison result notified from the comparing portion 133, whether or not the target voltage command value is lower than the output voltage value of the converter 10 (step S202). In the case where the target voltage command value is equal to or higher than the output voltage value of the converter 10 (step S202: No), the stop signal generation portion 2134 determines whether or not a stop signal is being output (step S203). In the case where the stop signal generation portion 2134 determines that a stop signal is not being output (step S203: No), the processing of step S201 is performed. In contrast, in the case where the stop signal generation portion 2134 determines that a stop signal is being output (step S203: Yes), the stop signal generation portion 2134 stops outputting a stop signal to the PWM signal generation circuit 2113 of the converter controller 11 (step S204). Subsequently, the processing of step S201 is performed.

Furthermore, in the case where the stop signal generation portion 2134 determines that the target voltage command value is lower than the output voltage value of the converter 10 (step S202: Yes), the stop signal generation portion 2134 generates a stop signal and outputs the generated stop signal to the PWM signal generation circuit 2113 (step S205). Subsequently, the processing of step S201 is performed.

As described above, in the DC-DC converter 2001 according to the second preferred embodiment, the converter controller 2011 compares the output voltage detected by the voltage detection circuit 15 with the reference voltage, and controls an operation of the converter 10 to provide a constant or substantially constant voltage of the output voltage. In the case where the target voltage command value input from the ECU 9 is lower than the output voltage value of the converter 10, the command processor 2013 outputs a stop signal to stop an operation of the converter 10 to the PWM signal generation circuit 2113 of the converter controller 2011. Accordingly, as in the first preferred embodiment, for example, a current monitor circuit that monitors a current flowing in the inductor L1 is not necessary. Therefore, the circuit configuration of the DC-DC converter 2001 can be simplified, while backflow is reliably reduced. Furthermore, backflow in the converter 10 from the sub-battery 7 to the main battery 6 can be reduced. Therefore, an excessive increase in the voltage on the main battery 6 side or overcharging in the main battery 6 can be reduced.

Third Preferred Embodiment

A synchronous rectification DC-DC converter according to a third preferred embodiment of the present invention first forcibly sets a reference voltage input to the converter controller 2011 to a voltage proportional to an output voltage of the converter 10, in the case where a target voltage command value is lower than an output voltage value. After that, in the case where a state in which the target voltage command value is lower than the output voltage value continues for a preset reference time or longer, the synchronous rectification DC-DC converter stops an operation of the converter.

Figure 6:
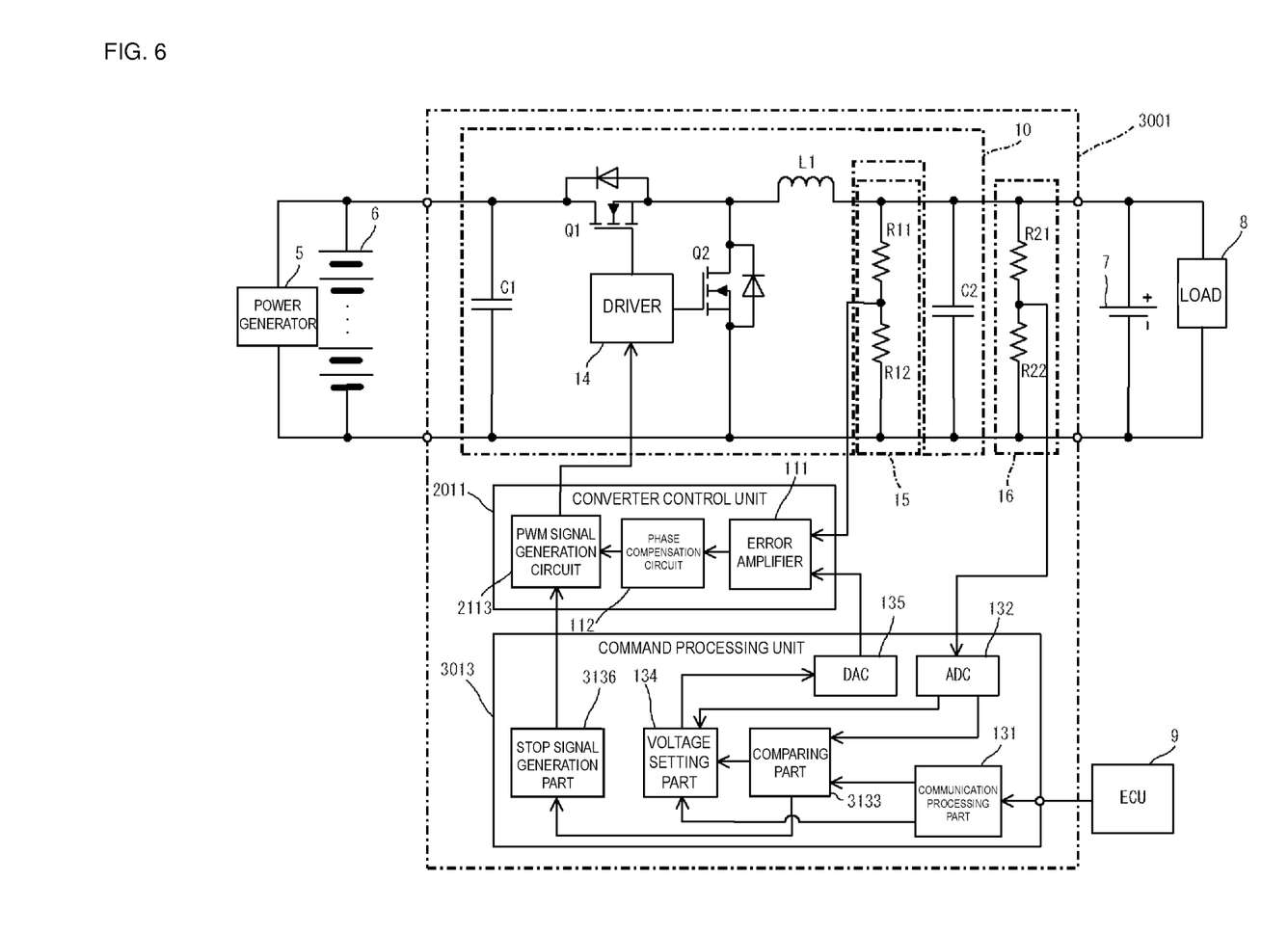
FIG. 6 is a circuit diagram of a switching power supply device according to a third preferred embodiment of the present invention.

For example, as shown in FIG. 6, a configuration of a command processor 3013 in a DC-DC converter 3001 according to the third preferred embodiment is different from configurations of the command processors 13 and 2013 in the first preferred embodiment and the second preferred embodiment. Note that, in FIG. 6, configurations the same as or similar to those in the first preferred embodiment are referred to with the same reference signs as those in FIG. 1, and configurations the same as or similar to those in the second preferred embodiment are referred to with the same reference signs as those in FIG. 4.

The command processor 3013 includes a communication processing portion 131, a comparing portion 3133, a voltage setting portion 134, a stop signal generation portion 3136, an ADC 132, and a DAC 135. The comparing portion 3133 compares a target voltage command value with an output voltage value of the converter 10, and notifies the voltage setting portion 134 and the stop signal generation portion 3136 of information indicating a comparison result.

According to the information indicating the comparison result notified from the comparing portion 3133, in the case where the target voltage command value is equal to or higher than the output voltage value of the converter 10, the stop signal generation portion 3136 prevents a stop signal from being output to the PWM signal generation circuit 2113 of the converter controller 2011. In contrast, in the case where a state in which the target voltage command value is lower than the output voltage value of the converter 10 continues for a preset reference time or longer, the stop signal generation portion 3136 generates a stop signal and outputs the generated stop signal to the PWM signal generation circuit 2113 of the converter controller 2011.

Figure 7:
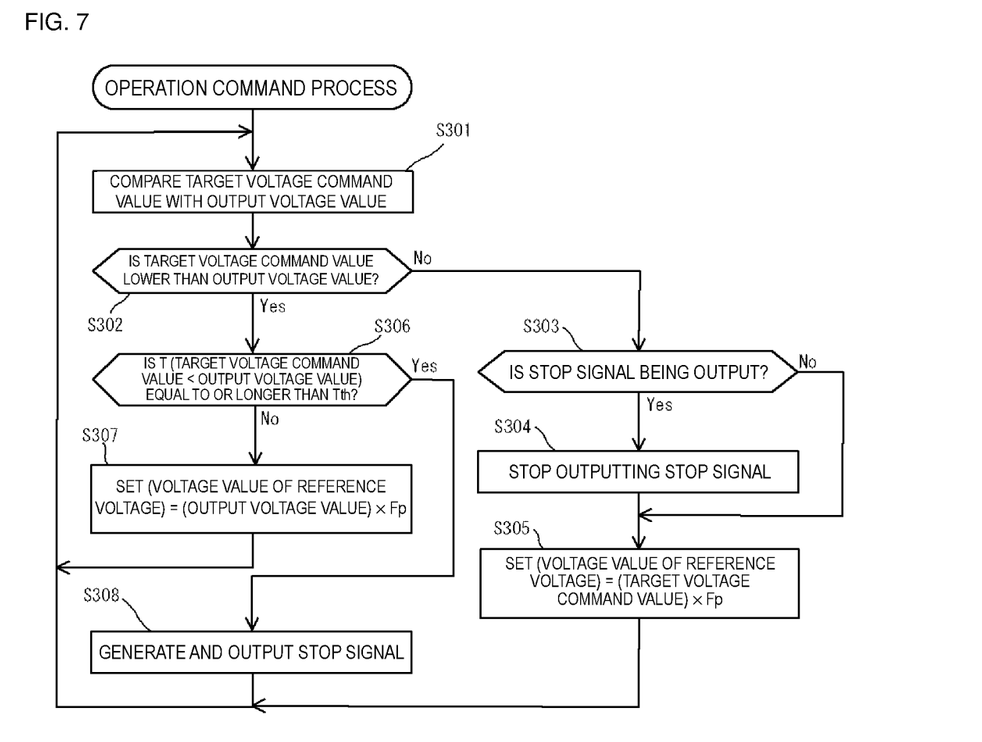
FIG. 7 is a flowchart showing an example of the flow of an operation command process performed by a command processor according to the third preferred embodiment of the present invention.

Next, an operation command process performed by the command processor 3013 according to the third preferred embodiment will be described with reference to FIG. 7. For example, when power is applied to the DC-DC converter 3001, the operation command process starts. First, the comparing portion 3133 calculates an output voltage value of the converter 10, based on a voltage value input from the ADC 132, and compares a target voltage command value with the calculated output voltage value of the converter 10 (step S301). The comparing portion 3133 notifies the voltage setting portion 134 and the stop signal generation portion 3136 of information indicating a comparison result.

Next, the stop signal generation portion 3136 determines, based on the information indicating the comparison result notified from the comparing portion 3133, whether or not the target voltage command value is lower than the output voltage value of the converter 10 (step S302). In the case where the stop signal generation portion 3136 determines that the target voltage command value is equal to or higher than the output voltage value of the converter 10 (step S302: No), the stop signal generation portion 3136 determines whether or not a stop signal is being output (step S303). In the case where the stop signal generation portion 3136 determines that a stop signal is not being output (step S303: No), processing of step S305, which will be described later, is performed. In contrast, in the case where the stop signal generation portion 3136 determines that a stop signal is being output (step S303: Yes), the stop signal generation portion 3136 stops outputting a stop signal to the PWM signal generation circuit 2113 of the converter controller 2011 (step S304).

Subsequently, the voltage setting portion 134 notifies the DAC 135 of a voltage value obtained by multiplying the target voltage command value by a voltage division ratio Fp of the voltage detection circuit 15, and thus sets the voltage value of the reference voltage output from the DAC 135 to the voltage value obtained by multiplying the target voltage command value by the preset voltage division ratio Fp (step S305). After that, the processing of step S301 is performed.

It is assumed that the stop signal generation portion 3136 determines that the target voltage command value is lower than the output voltage value of the converter 10 (step S302: Yes). In this case, the stop signal generation portion 3136 determines whether or not a duration T during which a state in which the target voltage command value is lower than the output voltage value of the converter 10 continues is equal to or longer than a preset reference time Tth (step S306). It is assumed that the stop signal generation portion 3136 determines that the duration T during which the state in which the target voltage command value is lower than the output voltage value of the converter 10 continues is shorter than the preset reference time Tth (step S306): No). In this case, the voltage setting portion 134 notifies the DAC 135 of a voltage value of the detection voltage detected by the voltage detection circuit 16. Accordingly, the voltage setting portion 134 sets the voltage value of the reference voltage output from the DAC 135 to the voltage value of the detection voltage detected by the voltage detection circuit 16, that is, the voltage value obtained by multiplying the output voltage of the converter 10 by a preset voltage division ratio Fp (step S307). Next, the processing of step S301 is performed.

In contrast, it is assumed that the stop signal generation portion 3136 determines that the duration T during which the state in which the target voltage command value is lower than the output voltage value of the converter 10 continues is equal to or longer than the preset reference time Tth (step S306: Yes). In this case, the stop signal generation portion 3136 generates a stop signal and outputs the generated stop signal to the PWM signal generation circuit 2113 of the converter controller 2011 (step S308). Subsequently, the processing of step S301 is performed.

As described above, in the DC-DC converter 3001 according to the third preferred embodiment, the converter controller 2011 compares the output voltage detected by the voltage detection circuit 15 with the reference voltage and controls an operation of the converter 10 to provide a constant or substantially constant voltage of the output voltage. It is assumed that the state in which the target voltage command value input from the ECU 9 is lower than the output voltage value of the converter 10 maintains for the preset reference time Tth or longer. In this case, the command processor 3013 outputs to the converter controller 2011 a stop signal commanding the converter controller 2011 to stop the operation of the converter 10. Accordingly, in the case where the state in which the target voltage command value is lower than the output voltage value of the converter 10 continues, a situation in which a state in which the value of the voltage across the sub-battery 7 is higher than the target voltage command value is left as it is for a reference time or longer is avoided. Thus, overcharging in the sub-battery 7 can be reduced.

Each of the preferred embodiments of the present invention has been described above. However, the present invention is not limited to the configurations of the preferred embodiments described above. For example, a configuration in which the power generator 5 is not connected is also possible.

In each of the preferred embodiments, an example in which the converter controller 11 or 2011 is an analog circuit has been described. However, the present invention is not limited to this. For example, the converter controller 11 or 2011 may be a digital circuit. In this case, the converter controller 11 or 2011 and the command processor 13, 2013, or 3013 may be implemented as an integrated circuit.

The preferred embodiments and modifications of the present invention (including the descriptions starting from "Note that"; the same applies below) have been described above. However, the present invention is not limited to these. The present invention encompasses appropriate combinations of the preferred embodiments and modifications, and the combinations with changes appropriately made thereto.

INDUSTRIAL APPLICABILITY

Preferred embodiments of the present invention are suitable as a synchronous rectification DC-DC converter mounted on a vehicle including two batteries.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A synchronous rectification DC-DC converter comprising:
　　a synchronous rectification converter that converts electric power;
　　a voltage detection circuit that detects a voltage proportional to an output voltage of the converter;
　　a converter controller that compares a detection voltage detected by the voltage detection circuit with a reference voltage and controls an operation of the converter to provide a constant or substantially constant voltage of the detection voltage; and
　　a command processor that sets, in a case where a target voltage command value input from outside is lower than a voltage value of the output voltage, a voltage value of the reference voltage to be equal or substantially equal to a voltage value of the detection voltage.

2. The synchronous rectification DC-DC converter according to claim 1, wherein when a state in which the target voltage command value input from the outside is lower than the voltage value of the output voltage continues for a preset reference time or longer, the command processor outputs to the converter controller a stop signal that signals the converter controller to stop the operation of the converter.

3. A switching power supply device that charges a first power storage device, comprising:

a second power storage device; and the synchronous rectification DC-DC converter according to claim 1, the second power storage device being electrically connected to an input side of the DC-DC converter; wherein the converter converts electric power supplied from the second power storage device and supplies the converted electric power to the first power storage device.

4. The switching power supply device according to claim 3, wherein the switching power supply device is mounted on a vehicle.

5. The switching power supply device according to claim 4, wherein the command processor is electrically connected to an ECU (Engine Controller) via a CAN (Control Area Network).

6. The synchronous rectification DC-DC converter according to claim 1, wherein the converter includes a inductor, a first switching element, a second switching element, and a driver that drives the first and second switching elements;

a drain of the first switching element is electrically connected to a first high potential output terminal, and a source of the first switching element is electrically connected to a first terminal of the inductor;

a drain of the second switching element is electrically connected to a first terminal of the inductor, and a source of the second switching element is electrically connected to a first low potential output terminal; and a second terminal of the inductor is electrically connected to a second high potential output terminal.

7. The synchronous rectification DC-DC converter according to claim 6, wherein the converter further includes a first capacitor and a second capacitor;

a first terminal of the first capacitor is electrically connected to the first high potential output terminal, and a second terminal of the first capacitor is electrically connected to the first low potential output terminal; and a first terminal of the second capacitor is electrically connected to the second terminal of the inductor and the second high potential output terminal, and a second terminal of the second capacitor is electrically connected to a second low potential output terminal.

8. The synchronous rectification DC-DC converter according to claim 6, wherein the first and second switching elements are N-channel field effect transistors.

9. The synchronous rectification DC-DC converter according to claim 6, wherein the first high potential output terminal is connected to a first power storage device and the second high potential output terminal is connected to a second power storage device different from the first power storage device.

10. The synchronous rectification DC-DC converter according to claim 6, wherein the driver applies a voltage to a gate of the first switching element and a gate of the second switching element, according to a pulse width modulation) signal provided by the converter controller.

11. The synchronous rectification DC-DC converter according to claim 1, wherein the voltage detection circuit is a voltage divider circuit including two resistors that are electrically connected in series.

12. The synchronous rectification DC-DC converter according to claim 7, wherein the voltage detection circuit detects a voltage across the first capacitor.

13. The synchronous rectification DC-DC converter according to claim 12, further comprising a second voltage detection circuit that detects a voltage across the first capacitor.

14. The synchronous rectification DC-DC converter according to claim 1, wherein the converter controller includes:

an error amplifier that amplifies a differential voltage between the detection voltage and the reference voltage; and a phase compensation circuit that stabilizes a feedback loop for the output voltage of the converter.

\* \* \* \* \*